3,491,211

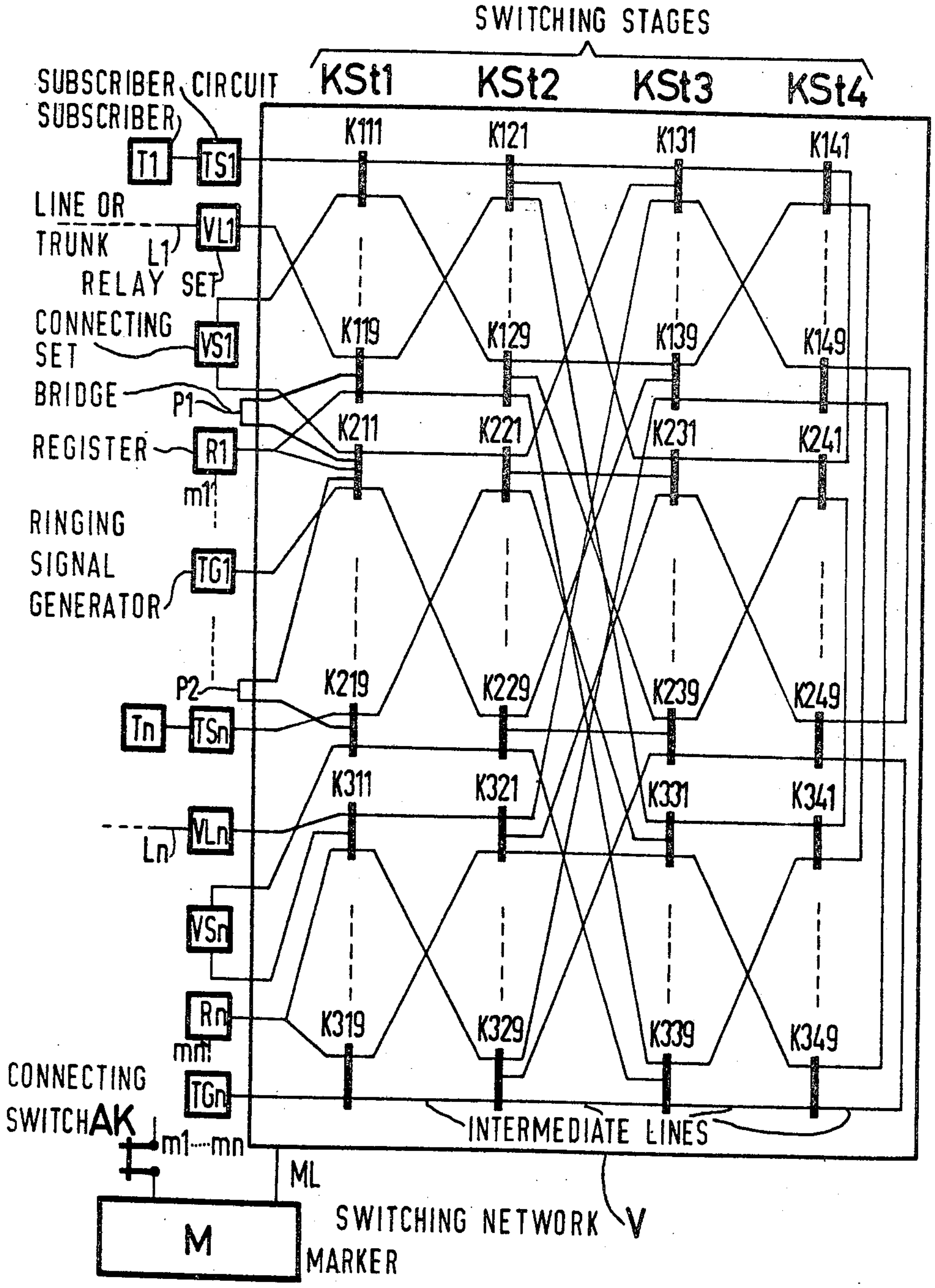
SWITCHING STAGES
KSt1
KSt2
KSt3
KSt4
SUBSCRIBER CIRCUIT
SUBSCRIBER
T1
TS1
LINE OR TRUNK
L1
VL1
RELAY SET
CONNECTING SET
VS1
BRIDGE
P1
REGISTER
R1
m1
RINGING SIGNAL GENERATOR
TG1
P2
Tn
TSn
VLn
Ln
VSn
Rn
mn
TGn
CONNECTING SWITCH AK
m1---mn
ML
M
MARKER
K111
K121
K131
K141
K119
K129
K139
K149
K211
K221
K231
K241
K219
K229
K239
K249
K311
K321
K331
K341
K319
K329
K339
K349
INTERMEDIATE LINES
SWITCHING NETWORK
V United States Patent Office 3,491,211
Patented Jan. 20, 1970

SWITCHING NETWORK WITH ALL CONNECTION ON THE INPUT SIDE

Norbert Bininda, Munich-Solln, and Helga Hofstetter, Munich, Germany, assignors to Siemens Aktiengesellschaft, Munich, Germany, a corporation of Germany Filed Mar. 28, 1966, Ser. No. 537,980
Claims priority, application Germany, Apr. 12, 1965, S 96,482
Int. Cl. H04m 3/42
U.S. Cl. 179—18 4 Claims

ABSTRACT OF THE DISCLOSURE

An exchange connection network for telephone systems in which all the lines and connecting links are connected to the input side of the switching network. A number of inputs of the first switching stage are not connected to lines of connecting links, but rather are connected together in pairs.

CROSS-REFERENCES TO RELATED APPLICATIONS

This invention relates to Ser. No. 443,242 filed on Mar. 29, 1965 in the names of Norbert Bininda et al., entitled Arrangement for Long-Distance Communication Exchange Installations, in Particular, Telephone Exchange Installations, now abandoned, which is expressly incorporated herein.

INTRODUCTION

The present invention relates to circuit arrangements for communication systems and, more particularly, to telephone communication systems comprising an exchange switching network including a plurality of switching stages interconnected with each other by intermediate lines.

STATE OF THE PRIOR ART

As described in detail in U.S. application Ser. No. 443,242, an arrangement for long distance exchange installations, particularly telephone installations, is provided. The exchange network is developed in several exchange switching stages which are connected by intermediate lines. The subscriber lines, the connection lines and inputs and outputs of all further connecting lines necessary, for each connection, for the establishment and supervision of a connection (connection sets, registers, call signal generators and the like) are connected in a similar manner to the inputs of a first switching stage. The outputs of the first, through to the next to the last switching stage are connected to the inputs of the next succeeding switching stage, and thereby can be joined together in pairs. Thus, in such an exchange network a connection is made when two inputs of the first switching stage, i.e., two similar end points of a through connection, are connected together.

In the following description subscriber lines, connection lines, connection sets, registers, call signal generators, etc., are generally referred to as "circuit means necessary (or required) per connection." As described in Ser. No. 443,242, it is known that through-connections between the circuit systems necessary per connection can be made so that two subscriber lines can be directly connected with each other. This is important in the case where subscriber circuits have subscriber microphone direct current supply and release supervision. Furthermore, two connection lines can also be directly connected with each other, so that through-traffic is possible without the need for special measures with regard to grouping. Also, since it is possible to connect two inputs of the first switching stage together by using only the switching stages up to the last switching stage, a saving of the connecting lines of the last switching stage is achieved.

Due to the fact that connection lines, inputs and outputs of connection sets, inputs of registers, call signal generators, etc., bear a considerably heavier load than the subscriber lines, and due to the similar connection of all above mentioned lines and connecting lines, they can be connected in a "mixed" fashion to adjacent inputs making possible a considerable distribution of the load. The terms "mixing," "mixed connection(s)," and "mixed" as used herein do not mean merely the customary parallel and series connections used in combination, but denote any type of circuit means such as connection lines, switch means, etc., which are connected in a mixed fashion to any one of the input means of the switching network. Thus, for example, if multi-stage switching arrangements are used, the loading in each case of several switching groups is equalized by appropriate connection of the inputs of the first switching group. Further, where the connection lines of the first switching stage are divided into different groups, for example, the multiple switches are divided into switching groups, the loading of each switching group can be controlled by mixing the subscriber lines on one hand, and the connection lines, connection sets, registers, call signal generators, etc., on the other hand, in a certain numerical ratio.

The overall exchange network can be used advantageously in exchange installations with switching matrices. As is known, such switching matrices consist of multiple switches arranged in several switching stages, which are connected by intermediate lines. The number of switching stages, switches per switching stage, inputs and outputs and switching points of the switches, and further intermediate lines, are designed to accommodate the traffic conditions of the particular exchange installations. In this manner for each exchange installation, the percentage of connections which are lost due to the traffic load of the exchange installation (path blocked due to internal congestion or busy connection paths) can be determined statistically.

These traffic conditions vary from installation to installation, but due to technical reasons switching matrixes can not be manufactured in an unlimited number of models. Upon installing all the connections of the exchange installation with the circuit means necessary per connection, an exact matching of the traffic load capability to the actual traffic conditions in an exchange installation is never achieved. But for manufacturing reasons a number of standard models of switching matrixes are designed and produced. For each particular application that model is selected which has a traffic load capacity that is closest to the traffic conditions of the planned installation. Since it is not possible to have exact adaptation to the prevailing traffic conditions, (a) a model is selected with a traffic load capability just above the requirements of the planned installation, and (b) an appropriate portion of the available switching matrix accesses (inputs of the multiple switches of the first switching stage) remains disconnected. Some of the input means and output means of the switching network remain unused in order to closely match the actual traffic load to the traffic load capability. For this purpose the ratio of the number of used input means and output means to the total number of input means and output means should be equal to the ratio between the traffic load capability of the switching network and the traffic load occurring in the exchange system.

The unused switching matrix accesses represent an expenditure which is wasted. They include a series of switching points, which for example, are formed by one relay each per switching point, and they may never be used.

OBJECTS

Accordingly, it is a primary object of the invention to overcome the disadvantages of the prior art by utilizing the previously unused switching matrix accesses.

A further object of the invention is to increase the capability of an exchange network by connecting the previously unused inputs of the first switching stage together in pairs.

Another object of the invention is to provide facilities for alleviating an "overflow" condition by connecting the unused inputs of the first switching stage together with bridges, thereby providing additional switching paths for the completion of a connection.

The exchange network includes several exchange switching stages which are connected together by intermediate lines. The subscriber lines, connection lines, and inputs and outputs of all further connecting lines necessary for establishing and supervising a connection are connected in a similar manner to the inputs of the first switching stage. The outlets of the first, through to the next to the last switching stage are connected to the inputs of the next succeeding switching stage and can be connected together in pairs. The portion of inputs to the first switching stage which are unused and are not necessary for the circuit systems necessary per connection are connected together in pairs. This forms bridges which, in times of overflow traffic, provide additional switching paths through which a connection may be made.

Additionally, the connection of the unused inputs together in pairs extends to various switches of the first switching stage, thus, the traffic load of the individual switches is substantially equalized.

According to a further embodiment of the invention, the inputs of the first switching stage which are connected in pairs are selected by the path finder in establishment of a connection only in case of "overflow." Thereby connections are only established over the inputs of the first switching stage which are connected in pairs when no other paths are open. This keeps the number of connections which are made over many switching stages to a minimum.

DRAWING

In the drawing there is shown an operative embodiment of the invention with only the components thereof absolutely necessary for the understanding thereof, but the invention is in no way limited to that embodiment.

DESCRIPTION OF THE INVENTION

In the drawing there is shown an exchange network V, also designated a switching network. The network is formed by couplers K111 to K349, for example, relay switches, arranged in four exchange circuit stages KS*t*1 to KS*t*4. The switches are connected with each other between successive switching stages each by intermediate lines (links). The outputs of the switches of the fourth switching stage are also permanently connected to each other in pairs by intermediate lines (links). Of the total number of switches and intermediate lines only a few are shown, so that the system for the formation of the exchange network V may be more easily understood. Subscribers T1 to T*n* are connected to the inputs of the switches of the switching stage KS*t*1 via subscriber line circuits TS1 to TS*n*; further, connection lines or trunks L1 to L*n* are connected thereto via trunk repeaters VL1 to VL*n*; further, the inputs and outputs of the connecting sets VS1 to VS*n* and the registers R1 to R*n* and ringing signal generators TG1 to TG*n* are also so connected.

The number of these circuit members in each case is determined in accordance with the individual requirements of the exchange network and need not be mentioned here. Further, the registers R1 to R*n* are directly connected to a central marker M (plural markers may be used) via input and output lines *m*1 to *mn*, through a connecting switch AK. The marker(s) M are connected with the exchange network V by marker lines ML. The setting processes for switches K111 to K349 are controlled over these marker lines ML.

The wiring of the inputs of the switches of the first switching stage KS*t*1 is arranged in a manner which will be described. As is known, individual subscriber lines are subject to considerably less traffic than all the other circuit members connected to the input members of the first switching stage. Therefore, subscriber lines, trunks and all the other shown circuit members are connected in a mixed fashion to the inputs of the first switching stage so that a desirable distribution of the traffic load on all of the switches can be achieved. It is also possible by appropriate selection and connection of heavily or lightly traffic-loaded lines or other circuit members to influence decidedly the exchange traffic load of a switch. The registers R1 to R*n* are each connected to inputs of two different switches. In this manner the effective accessibility of the registers, as compared to that of the other circuit members is increased in order that these few registers which are jointly provided for the establishment of all connections, are only inaccessible by means of internal congestion of the switching arrangement with considerably less likelihood than would otherwise be the case. It is possible to connect these registers in parallel simultaneously to more than two inputs of the switches of the first switching stage, so that the effective accessibility can be further increased. Likewise, it is also possible to provide this parallel connection for circuit members other than the registers.

In order that the arrangement of the invention may be better understood, some examples of establishment of connections will now be described. It will be assumed that one subscriber, for example, T1, has lifted his receiver. Over the subscriber line circuit TS1 assigned to him, a register, for example R1, is activated, in a manner not shown here. This register identifies the activating subscriber circuit and receives corresponding information via an identification arrangement already known, and not shown. Then this register R1 causes itself to be connected via the connecting switch AK to the marker M. The identification information is transmitted from register R1 to marker M which then establishes a through connection from the activating subscriber circuit TS1 to register R1 by means of path finding and path marking operations, in a known manner. For this through connection, for example, the following path can be esablished:

TS1, K111, K121, K231, K241, K341, K331, K221, K211, R1

Since such through connections are established by a path search through different possible idle paths, any one can be selected. Further, it is also possible to establish such a through connection via fewer switching stages and not as described via 2 x 4 switching stages (KS*t*1 to KS*t*4, KS*t*4 to KS*t*1). However, an intermediate line connecting the switches of the fourth switching stages KS*t*4 together may be omitted from the connection as follows:

TS1, K111, K121, K131, K149, K139, K229, K211, R1

Thus this circuit is completed via only one switch K149 of the fourth switching stage KS*t*4, since the outputs of switches K131, and K139 of the third switching stage KS*t*3 are both connected with inputs of switch K149 of the fourth switching stage. Thus the output of switch K149 is then seized blindly and serves only to connect together the two mentioned inputs by parallel connection thereto. Likewise, for this reason there can also be provided special blind outputs without intermediate lines. This kind of interconnection in switch K149 of the fourth switching stage is also designated as a short circuit connection.

Even though no intermediate line is saved by such a short circuit connection, a switch of the fourth switching stage is saved. It is also possible to establish connections over fewer switching stages, wherein the through connection in the highest-numbered switching stage is again a short circuit connection. Accordingly, the subscriber circuit TS1 can also be connected through to register R1, for example, via the following path:

TS1, K111, K129, K239, K229, K211, R1

Thus, in this connection, both of the switches of the fourth switching stage, and a switch of the third switching stage, are saved. Likewise, it is also possible to establish the connection between subscriber T1 and register R1 via only two switching stages, for example, via the following path:

TS1, K111, K129, K119, R1

In the case where a subscriber circuit and a register are both connected to one switch, it is possible to establish such a connection over only the first switching stage and over only a single switch.

According to the present invention, some of the inputs of the switches of the first switching stage, which have heretofore been unused, are connected together in pairs by bridges P1 and P2. A connection which is made over such a bridge P1 or P2, for example, from a subscriber T1 to subscriber T*n* may proceed in the following path:

T1, TS1, K111, K121, K119, P1, K211, K229, K219, TS*n*, T*n*

It may also be made in another manner by connecting over all the four switching stages twice. These connections over the bridges P1 and P2 are established only in the case of overflow i.e., when no other path is open.

In the above described path finding operation by the marker M, not only is a free path selected from several, but a path is selected whose through connection can be achieved by use of the smallest number of switching stages and multiple switches. Through this mode of functioning of the marker in finding a path, the switching stages, especially those of the higher ordinal numbers, and especially the last switching stage, are less burdened so that the elements of the last switching stage can be proportionally fewer. In such a manner it is possible to achieve a considerable saving of switches.

After the connection between the subscriber circuit TS1 and the register R1 is established, first the marker M switches off so that it can also control other setting processes in a known manner. Thus, the connection via the connecting switch AK is interrupted. Subscriber T1 receives a dial tone from register R1 and then dials the calling number of the subscriber with whom he desires to be connected, for example, the calling number of subscriber T*n*. This calling number is picked up by register R1. When such pickup is completed, register R1 again requests the marker. If it is idle, then it is again connected via connecting switch AK to register R1.

The complete dial information is transmitted to marker M, which simultaneously or successively conducts two path finding processes. In such a process a through connection can be completed via four switching stages and eight switches, or in the manner already described, via fewer switching stages and fewer switches, and also with the assistance of a bridge, for example, P1. The marker causes two path finding and adjusting processes, whereby the desired connection from subscriber T1 to subscriber T*n* consists of two partial connections, i.e., a first one from subscriber T1 to a connecting set, for example, VS1, which previously has been recognized as idle by the marker, and seized; and a second partial connection from this connecting set VS1 to the dialed subscriber T*n*. This connection between the two parties thus can be established over the following path, which is the shortest for the system shown in the drawing.

T1, TS1, K111, VS1, K211, K229, K219, TS*n*, T*n*

The mentioned connecting set contains, as is known, circuits for direct current supply to the subscriber apparatus, further circuit means for additional, already known, technical functions of the telephone art, for example, operator calling, interception, reconfirmation, shifting PBX apparatus, and others. However, it is also possible, if one abandons such special technical functions of the telephone art, that a connection from subscriber to subscriber can be established in the described manner in a direct interconnection through control by means of registers and markers, whereby the direct current supply of the subscriber apparatus and the supervision release can be taken over by the subscriber line circuits. For this purpose the circuits must be equipped with a storage relay which also takes over the supervision of release, without considerable additional expenditure. Such a direct interconnection from subscriber T1 to subscriber T*n* can, for example, be established over the following path which is the shortest for the system shown in the drawing:

T1, TS1, K111, K121, K231, K221, K219, TS*n*, T*n*

If this interconnection is compared with a connection over a connecting set and two partial connections over 2 x 4 switching stages each, then the use of a total of 16 switches can, for example, be reduced to 5 switches.

In the drawing there are further shown ringing signal generators TG1 to TG*n*. These known sound emitters or tone generators have the following significance. If a marker picks up the dial information from the register, then the marker first ascertains whether the desired subscriber is idle. If the idle condition is ascertained, then it interconnects through two single connections, i.e., a first one from the calling subscriber via the switching arrangement to a sound emitter which sends a ringing signal, and a second, from the called subscriber to a sound emitter which sends out calling signals, for example, ringing current. After the establishment of these two single connections, the marker next switches itself idle again, in order to be prepared for other exchange tasks. If the called party answers, then marker M is again requested by register R1. Again the marker receives from the register the information concerning the calling and the called subscriber and establishes a connection between both of these subscribers either over a connecting set or in a direct interconnection.

In the same fashion as two subscribers, two trunk repeaters, for example, VL1 and VL*n*, also can be connected with each other. Thus through traffic is possible. The double-directed mode of operation of trunk lines, such as L1 and L*n* operates particularly advantageously. The double-directed mode of operation poses no technical exchange and grouping difficulties, since all circuit members are connected to the switching arrangement in similar manner.

In the described manner it is also possible to establish connections between subscribers and trunks (for example, T1 and L1), between trunks and registers (for example, in the case of detour or "reversal" connections) and in any desired combination.

The possibility also exists that the load on the switches may be determined through a traffic metering apparatus or through measurement of the unsuccessful through-connection attempts, and that a balance of the traffic load of the different switching groups may be brought about such that, in each path finding operation the least burdened switches are preferred. This measure has special significance with regard to the first switching stage to the switches of which the subscribers are directly connected at the outputs thereof. Such subscribers transmit to each switch a partial traffic volume which cannot be controlled by a suitable path selection. Yet, since subscriber lines and trunks, connecting sets, sound emitters, registers, and the like, are connected to the inputs of each switch in a mixed fashion, in the selection of paths for connection thereto, the uncontrolled partial traffic volume, i.e., the subscribers traffic which is transmitted to switches, may be taken into consideration. Therefore, the sum of the mentioned partial traffic volume and the partial traffic value resulting from connections to trunks, connecting sets, etc., yields a balanced traffic load for all switches. For this purpose, in the path finding operation, the succession with which the intermediate lines to the first coupling stage is searched, is suitably varied depending on the traffic load of the switches of the first switching stage KS*t*1, to which these intermediate lines lead.

It is to be understood that the invention is not limited to the particular embodiments and features described and shown but that it comprises any modifications and equivalents within the scope of the appended claims.

We claim:

1. In a switching network for communication exchange installations which includes a plurality of switching stages each having a plurality of multiple switches, with the stages being connected together by intermediate lines; lines for connection to subscribers, said lines being connected to some of the inputs of the first coupling stage; circuit means operative in the establishment and supervision of connections, said means having both their inputs and outputs connected to other inputs of the first switching stage; the outputs of the first up to the next to the last switching stage being connected by the intermediate lines to the inputs of the next succeeding respective switching stage so that the switches can be connected together in pairs, the improvement which comprises:

means for bridging together in pairs inputs of the first coupling stage to which there are connected none of said circuit means and said lines.

2. Apparatus as recited in claim 1 wherein the bridging means connect together only inputs of different multiple switches of the first switching stage.

3. Apparatus as recited in claim 1 which further includes:

marker means for selecting a path including bridging means only when no other path in the switching network is available.

4. Apparatus as recited in claim 1 wherein a first portion of the inputs of the first switching stage are connected to the connection lines and to said circuit means, and a second portion of the inputs are connected together in pairs, and the number of the first portion is such as to exceed the nominal traffic load capacity of the switching network corresponding to a given loss, but an additional traffic load capacity is achieved by connecting the second portion of the inputs together in pairs.

References Cited

UNITED STATES PATENTS

| | | | |
|---|---|---|---|
| 2,299,203 | 10/1942 | Beaumont | 179—22 |
| 3,308,243 | 3/1967 | Roscoe. | |
| 3,308,242 | 3/1967 | Erwin | 179—18 |

WILLIAM C. COOPER, Primary Examiner